United States Patent
Kaneda

(10) Patent No.: US 8,533,417 B2
(45) Date of Patent: Sep. 10, 2013

(54) METHOD AND APPARATUS FOR CONTROLLING DATA VOLUME CREATION IN DATA STORAGE SYSTEM WITH DYNAMIC CHUNK ALLOCATION CAPABILITY

(75) Inventor: Yasunori Kaneda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 328 days.

(21) Appl. No.: 12/477,268

(22) Filed: Jun. 3, 2009

(65) Prior Publication Data
US 2010/0312976 A1    Dec. 9, 2010

(51) Int. Cl.
*G06F 12/00* (2006.01)
*G06F 13/00* (2006.01)

(52) U.S. Cl.
USPC ........... 711/170; 711/154; 711/162; 711/171; 711/172; 711/E12.001; 711/E12.103

(58) Field of Classification Search
USPC .......... 711/170, 171, 172, 154, 162, E12.001, 711/E12.103
See application file for complete search history.

(56) References Cited

U.S. PATENT DOCUMENTS

| | | | |
|---|---|---|---|
| 6,836,819 B2 | 12/2004 | Kano et al. | |
| 7,971,025 B2 * | 6/2011 | Murase et al. | 711/173 |
| 8,281,068 B2 | 10/2012 | Kono et al. | |
| 2006/0218364 A1 | 9/2006 | Kitamura | |
| 2006/0230246 A1 * | 10/2006 | Mather et al. | 711/170 |
| 2007/0214338 A1 | 9/2007 | Mizuno et al. | |
| 2007/0234109 A1 | 10/2007 | Soran et al. | |
| 2007/0266218 A1 | 11/2007 | Achiwa | |
| 2008/0065853 A1 * | 3/2008 | Yamagami | 711/170 |
| 2008/0229048 A1 | 9/2008 | Murase et al. | |

FOREIGN PATENT DOCUMENTS

| | | |
|---|---|---|
| EP | 2 026 191 A2 | 2/2009 |
| WO | 2005/017737 A2 | 2/2005 |

OTHER PUBLICATIONS

Hough, Sr. et al., "3PAR Thin Provisioning, Eliminating Allocated-But-Unused Storage and Accelerating ROI", 3PAR White Paper, Jun. 2003, 3PARdata, Inc., Fremont, CA, USA.

* cited by examiner

*Primary Examiner* — Midys Rojas
(74) *Attorney, Agent, or Firm* — Mattingly & Malur, PC

(57) ABSTRACT

Embodiments of the invention provide methods and apparatus for controlling data volume creation at the storage system. In one embodiment, a storage system comprises a processor; a memory; and a plurality of chunks that are to be allocated to data volumes, each chunk having one or more data blocks. The plurality of chunks include zero or more used chunks which are allocated to one or more data volumes, and zero or more remaining chunks which are not used chunks. A new data volume creation operation to create a new data volume is prohibited or warned against before the new data volume is created, in accordance with a total number of the remaining chunks in the storage system. The remaining chunks may further include reserved chunks which are reserved for use in one or more data volumes but have not been allocated.

15 Claims, 26 Drawing Sheets

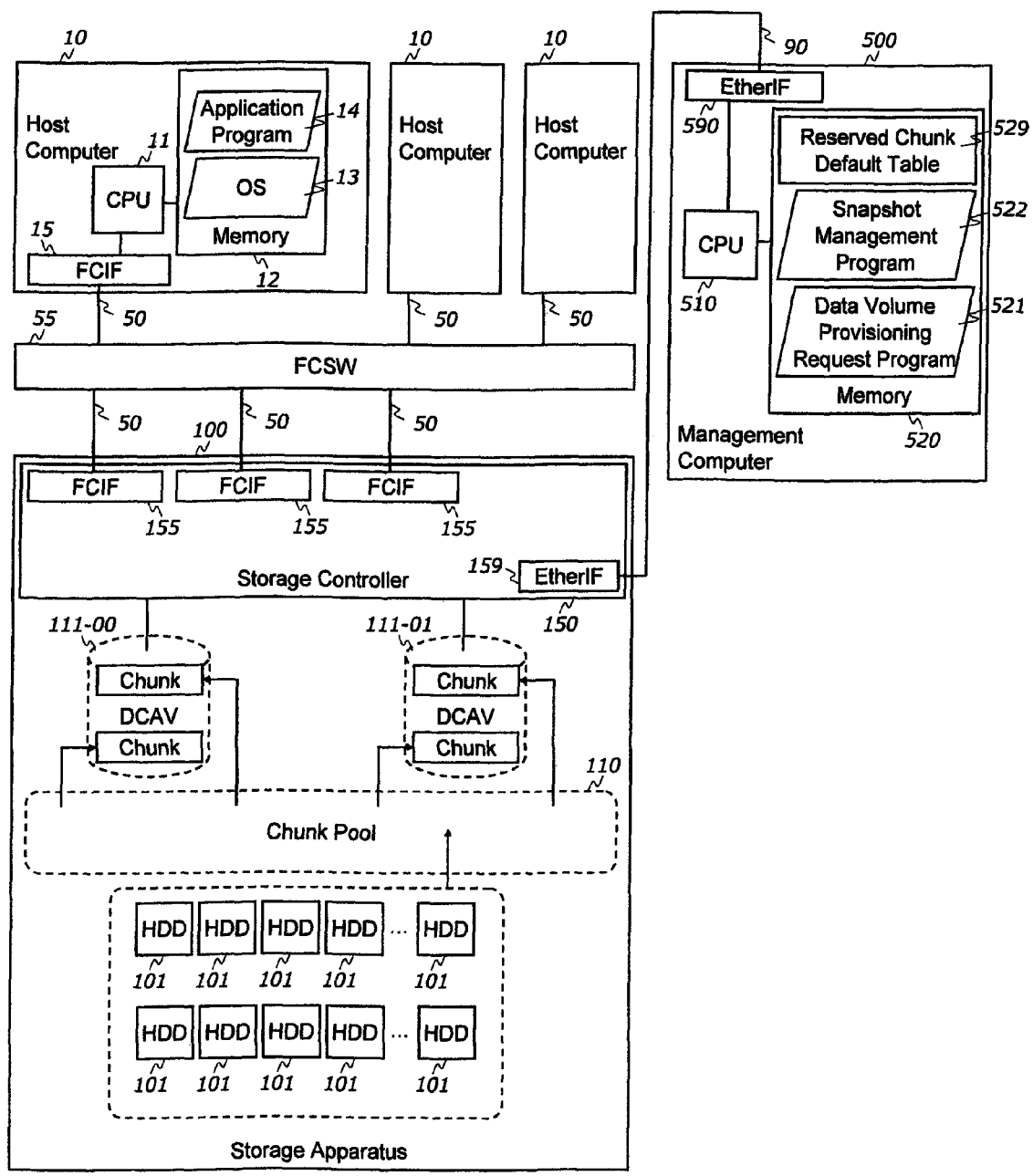

Fig.3 (a)

| HDD Number | LBA Range | Chunk Number | Is Allocated | Volume Number |
|---|---|---|---|---|
| 101-01 | 0~4095 | 10000 | | |
| | 4096~8191 | 10001 | | |
| | 8192~12287 | 10002 | | |
| | ⋮ | | | |
| 101-02 | 0~4095 | 20000 | | |
| | 4096~8191 | 20001 | | |
| | 8192~12287 | 20002 | | |
| | ⋮ | | | |
| | ⋮ | | | |

Chunk Pool Management Table

| RAID Group Number 16801 | HDD Number 16802 | LBA Range 16803 | Chunk Number 16804 | Is Allocated 16805 | Volume Number 16806 |
|---|---|---|---|---|---|
| 1 | 101-01<br>101-02<br>101-03<br>101-04<br>101-05 | 0~4095 | 10000 | Yes | 111 |
|  |  | 4096~8191 | 10001 | Yes | 111 |
|  |  | 8192~12287 | 10002 | Yes | 111 |
|  |  | ⋮ |  |  |  |
| 2 | 101-06<br>101-07<br>101-08<br>101-09<br>101-10 | 0~4095 | 20000 |  |  |
|  |  | 4096~8191 | 20001 |  |  |
|  |  | 8192~12287 | 20002 |  |  |
|  |  | ⋮ |  |  |  |
| ⋮ |  |  |  |  |  |

Chunk Pool Management Table

Fig.4

| Segment Number | Is Allocated | Chunk Number |
|---|---|---|
| 0 | | |
| 1 | | |
| 2 | | |
| ⋮ | | |

169

16901 16902 16903

Chunk Table

Fig.5 (a)

| Total Number of Chunks 16701 | Total Number of Used Chunks 16702 | Threshold 16703 | Volume Number 16704 | Reserved Chunks 16705 | Used Chunks 16706 | Total Number of Reserved Chunks 16707 |
|---|---|---|---|---|---|---|
| 1,000,000 | 0 | 900,000 | | ... | | 0 |

Chunk Pool State Table

| Total Number of Chunks 16701 | Total Number of Used Chunks 16702 | Threshold 16703 | Volume Number 16704 | Reserved Chunks 16705 | Used Chunks 16706 | Total Number of Reserved Chunks 16707 |
|---|---|---|---|---|---|---|
| 1,000,000 | 0 | 900,000 | 111-00 | 10,000 | 0 | 10,000 |
| | | | ... | ... | | |

167

Chunk Pool State Table

Fig.5(c)

| Total Number of Chunks 16701 | Total Number of Used Chunks 16702 | Threshold 16703 | Volume Number 16704 | Reserved Chunks 16705 | Used Chunks 16706 | Total Number of Reserved Chunks 16707 |
|---|---|---|---|---|---|---|
| 1,000,000 | 801,000 | 900,000 | 111-00 | 4,000 | 6,000 | 100,000 |
| | | | 111-01 | 0 | 20,200 | |
| | | | ... | ... | | |
| | | | 111-95 | 10,000 | 0 | |
| | | | 111-96 | 10,000 | 0 | |
| | | | 111-97 | 10,000 | 0 | |
| | | | 111-98 | 10,000 | 0 | |
| | | | 111-99 | 10,000 | 0 | |

167

Chunk Pool State Table

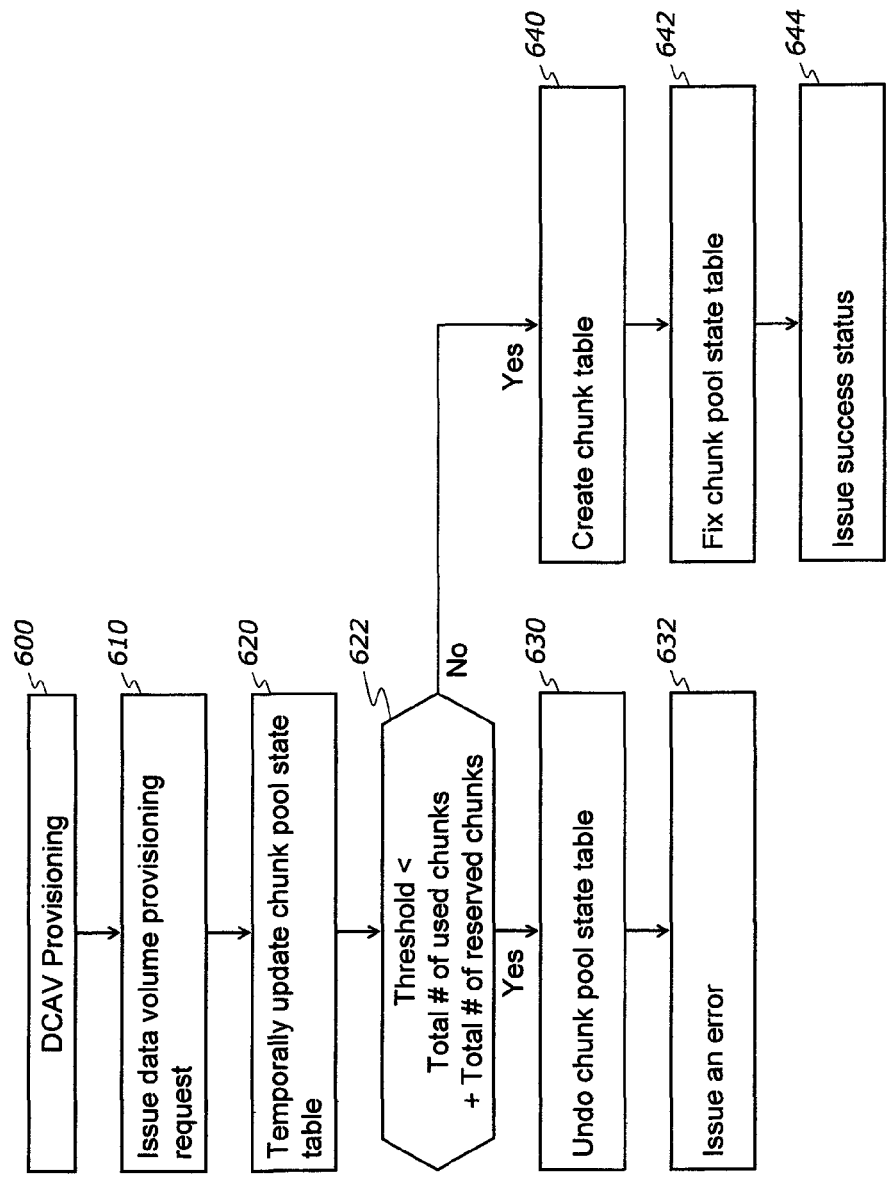

| Volume Creation Operation Screen |
|---|
| Volume Size: [ 100 ] GB |
| [OK] |

(b)

| Volume Creation Operation Screen |
|---|
| Volume Size: [ 100 ] GB |
| Initial Size: [ 10 ] GB |
| [OK] |

Fig.7
(c)

| Volume Creation Operation Screen | | |
|---|---|---|
| Volume Size: | 100 | GB |
| Usage: | ○ OS Type A | |
| | ● OS Type B | |
| | ○ OS Type C | |
| | ○ Data Volume | |
| | | OK |

(d)

| Volume Creation Operation Screen | | |
|---|---|---|
| Volume Size: | 100 | GB |
| Usage: | ○ OS Type A | |
| | ● OS Type B | |
| | ○ OS Type C | |
| | ○ Data Volume | |
| Date & Time: | 2009/5/1 00:00:00 | |
| | | OK |

| Default Number of Reserved Chunk |
|---|
| 10,000 |

Reserved Chunk Default Table

(b)

529

| Usage | Default Number of Reserved Chunk |
|---|---|
| OS Type A | 10,000 |
| OS Type B | 5,000 |
| OS Type C | 25,000 |
| Data Volume | 0 |

Reserved Chunk Default Table

Fig.12

| Segment Number | Is Allocated | Chunk Number at Snapshot Number | | | |
|---|---|---|---|---|---|
| | | 111-00-000 | 111-00-001 | ... | 111-00-xxx |
| 0 | | | | | |
| 1 | | | | | |
| 2 | | | | | |
| ... ... | | | ⋮ | | |

*16901*   *16902*   *16903*     *169*

Chunk Table

Fig.13

| Volume Number | Snapshot Number | Timestamp | |
|---|---|---|---|
| 111-00 | 111-00-000 | 2009/04/29 | 1:00pm |
| | 111-00-001 | 2009/04/29 | 2:00pm |
| | 111-00-002 | 2009/04/29 | 3:00pm |
| | 111-00-003 | 2009/04/29 | 4:00pm |
| | 111-00-004 | 2009/04/29 | 5:00pm |
| | 111-00-005 | 2009/04/29 | 6:00pm |
| | 111-00-006 | 2009/04/29 | 7:00pm |
| | 111-00-007 | 2009/04/29 | 8:00pm |
| | 111-00-008 | 2009/04/29 | 9:00pm |
| | 111-00-009 | 2009/04/29 | 10:00pm |
| 111-01 | | | |
| 111-02 | | | |
| .. | | | |

Snapshot Catalog Table

| Category | Chunk Number | Snapshot Number | Timestamp |
|---|---|---|---|
| Used | ⋮ | | |
| Unused | ⋮ | | |
| Snapshot | | | |
| | ⋮ | | |

Classify Table

Fig.19

Select Delete Generation Operation Screen

| 111-00 | 111-01 | 111-02 |

☒ 2009/04/29 1:00pm
☒ 2009/04/29 2:00pm
☒ 2009/04/29 3:00pm
☒ 2009/04/29 4:00pm
☒ 2009/04/29 5:00pm
☒ 2009/04/29 6:00pm
☐ 2009/04/29 7:00pm
☐ 2009/04/29 8:00pm
☐ 2009/04/29 9:00pm
☐ 2009/04/29 10:00pm

Freed Chunks: 2500    Delete
18001    18002

| Date & Time | Total Number of Chunks | Total Number of Unused Chunks | Total Number of Used Chunks | Total Number of Snapshot Chunks |
|---|---|---|---|---|
|  |  |  |  |  |
|  |  |  |  |  |
|  |  |  |  |  |
|  |  |  |  |  |
| : | | | | |

Chunk Consumption Trace Table

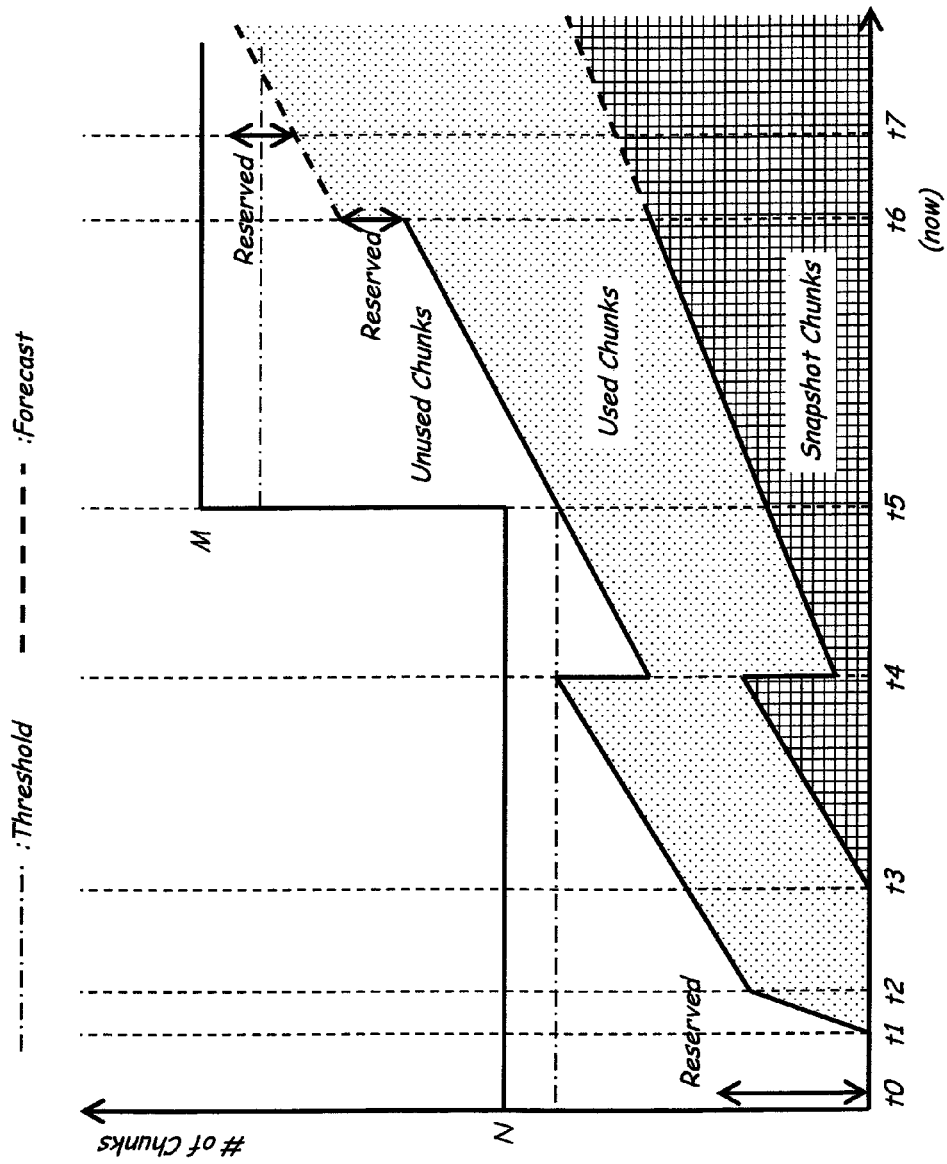

METHOD AND APPARATUS FOR CONTROLLING DATA VOLUME CREATION IN DATA STORAGE SYSTEM WITH DYNAMIC CHUNK ALLOCATION CAPABILITY

BACKGROUND OF THE INVENTION

The present invention relates generally to storage systems and, more particularly, to methods and apparatus for controlling data volume creation at a data storage system with dynamic chunk allocation capability.

To reduce wasted physical blocks in a data volume, dynamic chunk allocation capability is adopted in a storage system. This type of storage system has special data volumes, which means that the data volumes have no physical block initially. The storage system allocates a chunk from a chunk pool when the data volumes receive a write command and a chunk has not been allocated to the appropriate segment as specified in the write command yet. The special data volumes, referred to herein as "dynamic chunk allocation volumes (DCAVs)," are created with no chunk consumption. Therefore a huge number of DCAVs may be created at once. For example, in the case of a huge number of virtual server deployment, the huge number of DCAVs are created and associated. However the huge number of DCAVs are used (e.g., to install OS and application software from host computers) concurrently thereafter, and the chunks are consumed rapidly. As a result of rapid consumption of the chunks, the storage system must be halted in a short time.

Methods of dynamic chunk allocation capability in storage systems are disclosed, for example, in US2007/0234109 and U.S. Pat. No. 6,836,819. More specifically, these references disclose methods for issuing an alert when the number of used chunks exceeds a predetermined threshold. However, they do not disclose any methods and apparatuses for controlling a data volume creation in accordance with the number of used/unused chunks and/or capacity growth information.

BRIEF SUMMARY OF THE INVENTION

Exemplary embodiments of the invention provide methods and apparatus for controlling data volume creation at the data storage system. The data storage system has dynamic chunk allocation capability such that a chunk is allocated to a data volume from a chunk pool when the data volume receives a write command and a chunk has not been allocated to the appropriate segment yet. Data volume creation is controlled.

The data storage system with dynamic chunk allocation has alert capabilities. The alert is reported when the number of used chunks exceeds a predetermined threshold. However, a lot of data volumes are created and write operations are executed concurrently, and the storage system will need to be halted due to a lack of chunks. For instance, plural OS and application software installations consume a lot of chunks after starting the installations. To prevent the halt, data volume creations are prohibited or alerted in accordance with the number of used/unused chunks in the storage system and/or capacity growth information. Prior technologies do not prohibit a data volume creation. The lack of chunk and storage system halt may occur after the system starts using the dynamic chunk allocation volumes. This invention prohibits the data volume creation in accordance with estimations beforehand.

A dynamic chunk allocation program in the storage system allocates chunks to a data volume from a chunk pool. A chunk pool management table and a chunk table are used by the dynamic chunk allocation program. The storage system has a data volume creation prohibition program that determines whether a data volume can be created or should be prohibited. The data volume prohibition program refers to the number of used/unused chunks and/or capacity growth information for determining the prohibition.

The storage apparatus may further include a snapshot program for taking snapshots of plural generations of a data volume. The snapshot generations also consume chunks. In that case, the data volume prohibition program refers to the number of used/unused chunk, capacity growth information, and/or number of chunks used for snapshot generations for determining the prohibition.

In accordance with an aspect of the present invention, a storage system comprises a processor; a memory; and a plurality of chunks that are to be allocated to data volumes, each chunk having one or more data blocks. The plurality of chunks include zero or more used chunks which are allocated to one or more data volumes, and zero or more remaining chunks which are not used chunks. A new data volume creation operation to create a new data volume is prohibited or warned against before the new data volume is created, in accordance with a total number of the remaining chunks in the storage system.

In some embodiments, the remaining chunks include unused chunks which are not allocated to the one or more data volumes, and reserved chunks which are reserved for use in one or more data volumes but have not been allocated to the one or more volumes. The new data volume creation operation is prohibited if a sum of a total number of the used chunks and a total number of the reserved chunks is greater than a total number of the chunks in the storage system. The new data volume creation operation is warned against with an alert if a sum of a total number of the used chunks and a total number of the reserved chunks is greater than a threshold which is equal to a percentage of a total number of the chunks in the storage system, which is less than 100 percent. The plurality of chunks include one or more snapshot chunks which are allocated for data volume images of one or more data volumes at certain times representing snapshot generations of the one or more data volumes. The plurality of chunks include zero or more remaining chunks which are not used chunks and which are not snapshot chunks.

In specific embodiments, the new data volume creation operation is prohibited if a sum of a total number of the used chunks, a total number of the snapshot chunks, and a total number of the reserved chunks is greater than a total number of the chunks in the storage system. The new data volume creation operation is warned against with an alert if a sum of a total number of the used chunks, a total number of the snapshot chunks, and a total number of the reserved chunks is greater than a threshold which is equal to a percentage of a total number of the chunks in the storage system, which is less than 100 percent. The memory includes a snapshot module configured, upon receiving a snapshot delete request, to convert one or more snapshot chunks to unused chunks. The memory includes a chunk state monitoring module configured to monitor the numbers of the chunks, the used chunks, the unused chunks, the reserved chunks, and the snapshot chunks, and to estimate future consumption of the chunks. The new data volume creation operation is prohibited or warned against before the new data volume is created, in accordance with the estimated future consumption of the chunks.

In accordance with another aspect of the invention, a storage system comprises a processor; a memory; and a plurality of chunks that are to be allocated to data volumes which include at least one primary volume and at least one secondary volume, the at least one secondary volume being used to store data which is based on data stored in the at least one primary volume, each chunk having one or more data blocks. The plurality of chunks include zero or more used chunks which are allocated to one or more data volumes and zero or more unused chunks which are not allocated to one or more data volumes. A new data volume creation operation to create a new data volume is prohibited or warned against before the new data volume is created, in accordance with a total number of the used chunks in the at least one primary volume.

In some embodiments, the new data volume creation operation is prohibited or warned against before the new data volume is created, in accordance with a total number of the used chunks in the at least one primary volume and the at least one secondary volume. The new data volume creation operation is prohibited or warned against before the new data volume is created, in accordance with a total number of the used chunks and a total number of reserved chunks in the at least one primary volume and the at least one secondary volume. The reserved chunks are reserved for use in, but have not been allocated to, the at least one primary volume and the at least one secondary volume. The plurality of chunks include one or more snapshot chunks which are allocated to the at least one secondary volume for data volume images of the at least one primary volume at certain times representing snapshot generations of the at least one primary volume. A new data volume creation operation is to be performed to create a new data volume in response to a write command received by the storage system. The new data volume creation operation in response to the write command is prohibited until a specified date and time assigned to the new data volume has expired.

In accordance with another aspect of the invention, a storage system comprises a processor; a memory; and a plurality of chunks that are to be allocated to data volumes, each chunk having one or more data blocks. The plurality of chunks include zero or more used chunks which are allocated to one or more data volumes, and zero or more remaining chunks which are not used chunks. A first write operation against one of said data volumes that has not received any write operation data volume is prohibited or warned against in accordance with a total number of the remaining chunks in the storage system.

In some embodiments, a new data volume creation operation to be performed to create a new data volume is prohibited or warned against before the new data volume is created, in accordance with a total number of the remaining chunks in the storage system. The remaining chunks include unused chunks which are not allocated to the one or more data volumes, and reserved chunks which are reserved for use in one or more data volumes but have not been allocated to the one or more volumes.

These and other features and advantages of the present invention will become apparent to those of ordinary skill in the art in view of the following detailed description of the specific embodiments.

BRIEF DESCRIPTION OF THE DRAWINGS

FIGS. 3(a)-(b) show examples of the chunk pool management table in the memory of the storage apparatus of FIG. 1(b).

FIG. 4 shows an example of the chunk table 169 in the memory of the storage apparatus of FIG. 1(b) for the dynamic chunk allocation volume.

FIGS. 5(a)-(c) show examples of the chunk pool state table in the memory of the storage apparatus of FIG. 1(b).

FIG. 6 shows an example of a process flow diagram for a DCAV provisioning process.

FIGS. 7(a)-(d) show examples of management screens for creating DCAV on the management computer of FIG. 1(a).

FIGS. 8(a)-(b) show examples of the reserved chunk default table in the management computer of FIG. 1(a).

FIG. 12 shows an example of a chunk table in the memory of the storage apparatus of FIG. 1(b) according to the second embodiment.

FIG. 13 shows an example of a snapshot catalog table in the memory of the storage apparatus of FIG. 1(b) according to the second embodiment.

FIG. 17 shows an example of a classify table in the memory of the storage apparatus of FIG. 1(b) according to the second embodiment.

FIG. 19 shows an example of a screen display in the management computer for a select delete generation operation screen.

FIG. 20 shows an example of a chunk consumption trace table 166 in the memory of the storage apparatus of FIG. 1(b).

FIG. 21 shows a graph which is visualized from the chunk consumption trace table.

DETAILED DESCRIPTION OF THE INVENTION

Figure 1:
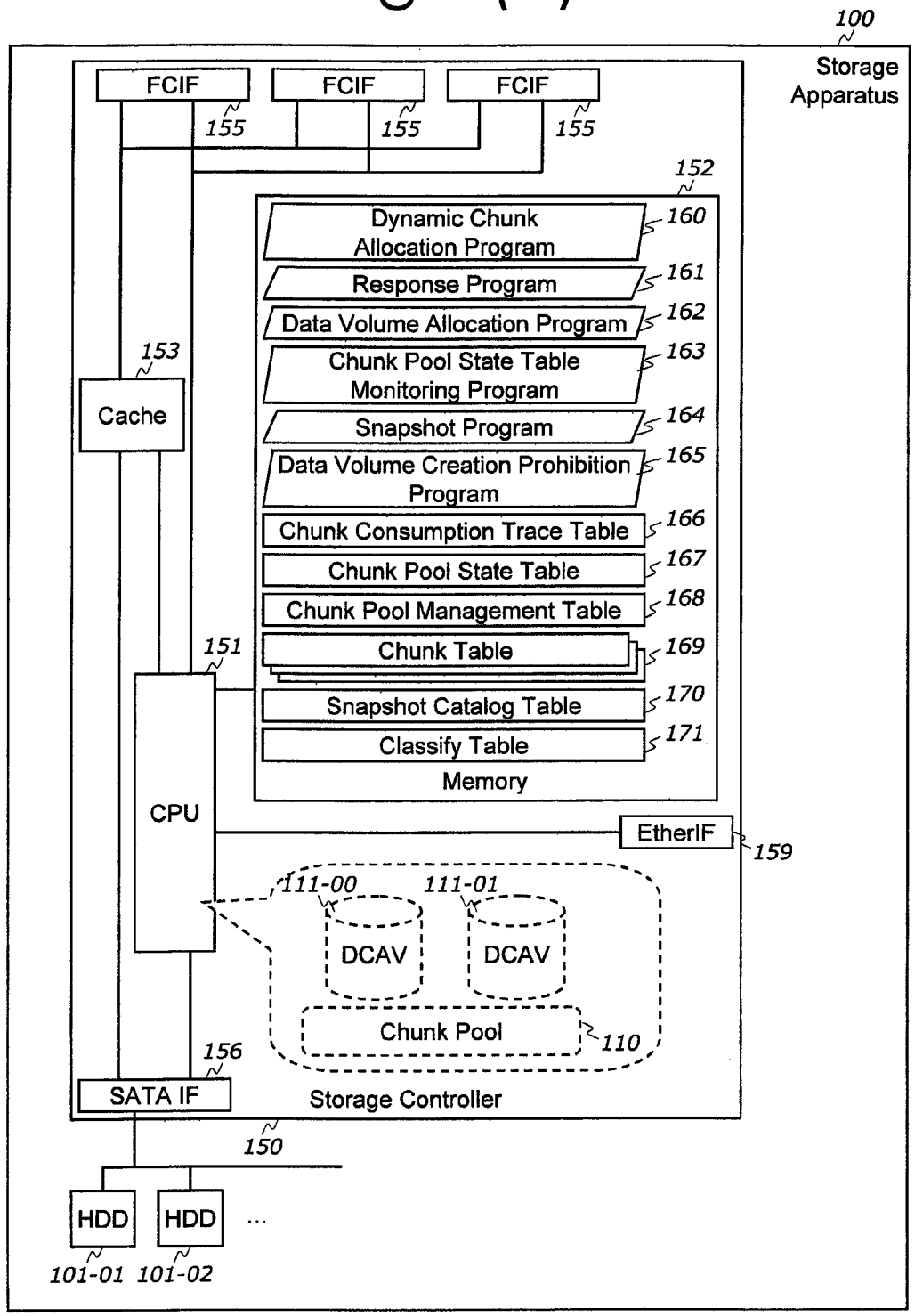
FIG. 1(a) illustrates an example of a hardware configuration of an information system in which the method and apparatus of the invention may be applied.
FIG. 1(b) illustrates an example of a hardware configuration and logical structure of the storage apparatus in the information system of FIG. 1(a).

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for controlling data volume creation at the data storage system with dynamic chunk allocation capability.

First Embodiment

A. System Configuration and Logical Structure

FIG. 1 illustrates an example of a hardware configuration of an information system in which the method and apparatus of the invention may be applied. The information system includes a host computer 10, a storage apparatus 100, a management computer 500, a data network 50, and a management network 90.

At least one host computer 10 is connected to the storage apparatus 100 via the data network 50. In this embodiment, at least one OS (operating system) 13 is executed on the host computer 10. An application program 14 may be executed on the OS 13. Files and data for the OS 13 and the application program 14 are stored in data volumes, which are provided by the storage apparatus 100. The OS 13 and the application program 14 issue write and/or read commands to the storage apparatus 100. The OS 13 and application program 14 are installed at the beginning. Large amounts of data are written to the data volume after starting the installation.

The information system has at least one storage apparatus 100, each of which includes a storage controller 150 and one or more HDDs (hard disk drives) 101. The storage apparatus 100 has one or more chunk pools 110, which is composed of one or more HDDs 101. The storage apparatus 100 provides one or more data volumes to the host computer 10. In this embodiment, the storage apparatus 100 has a dynamic chunk allocation program 160 (see FIG. 1(b)). The data volume is created as a dynamic chunk allocation volume (DCAV). At least one management computer 500 is connected to the storage apparatus 100 via the management network 90.

The host computer 10 and the storage apparatus 100 are connected via the data network 50. The data network 50 in this embodiment is Fibre Channel. However, other networks such as Ethernet and Infiniband can be used. Network switches and hubs can be used for connecting each other. In FIG. 1(a), a Fibre Channel Switch 55 (FCSW 55) is used for connecting the host computer(s) 10 and the storage apparatus(es) 100. The host computer 10 and the storage apparatus 100 have one or more Fibre Channel interface board (FCIF) 15, 155 for connecting to the Fibre Channel data network 50.

The storage apparatus 100 is connected to the management computer 500 via the management network 90. The management network 90 in this embodiment is Ethernet. However, other networks or connections can be used. Network switches and hubs can be used for connecting each other. The storage apparatus 100 and the management computer 500 have one or more Ethernet interface board (EtherIF) 159, 590 for connecting to the Ethernet management network 90.

As seen in FIG. 1(a), the host computer 10 includes a CPU 11 for executing programs stored in a memory 12, which stores programs and data, and an FCIF 15 for connecting to the data network 50. At least two programs are executed by the CPU 11. In this embodiment, the memory 12 stores an operating system program 13 (OS 13) and an application program 14.

The management computer 500 includes a CPU 510 for executing programs stored in a memory 520, which stores programs and data, and an EtherIF 590 for connecting to the management network 90. At least two programs are executed by the CPU 510. In this embodiment, the memory 520 stores a data volume provisioning request program 521 for issuing data volume creation requests to the storage apparatus 100, and a snapshot management program 522 for managing snapshot generations (in the second embodiment).

FIG. 1(b) illustrates an example of a hardware configuration and logical structure of the storage apparatus 100 in the information system of FIG. 1(a). The storage apparatus 100 includes one or more HDDs 101 for storing data, and one or more storage controllers 150 for providing data volumes to the host computers 10. The storage controller 150 includes a CPU 151 for executing programs stored in a memory 152, which stores programs and data, an FCIF 155 for connecting to the data network 50, a SATA IF 156 for connecting to the HDD 101 (if the HDD 101 has another interface such as FC, SCSI SAS, appropriate interface should be implemented), a cache 153 for storing data received from the host computer 10 and read from the HDDs 101, and an EtherIF 159 for connecting to the management network 90. At least six programs are executed by CPU 151.

In this embodiment, the memory 152 stores a dynamic chunk allocation program 160 for allocating chunk to data volumes when write request is received and no chunk is there, a response program 161 for responding to at least READ CAPACITY/READ/WRITE commands from the host computer 10, a data volume allocation program 162 for creating a dynamic chunk allocation volume and allocating it to the host computer 10, a chunk pool state table monitoring program 163 for monitoring chunk pool state table and issuing alerts to the management computer 500, a snapshot program 164 for assigning snapshot numbers and converting snapshot chunks to unused chunks according to snapshot delete requests, and a data volume creation prohibition program 165 for determining whether a data volume can be created or should be prohibited in accordance with the number of used chunks and/or the number of reserved chunks. The memory 152 further stores a chunk consumption trace table 166, a chunk pool state table 167, a chunk pool management table 168, a chunk table 169, a snapshot catalog table 170, and a classify table 171.

Figure 2:
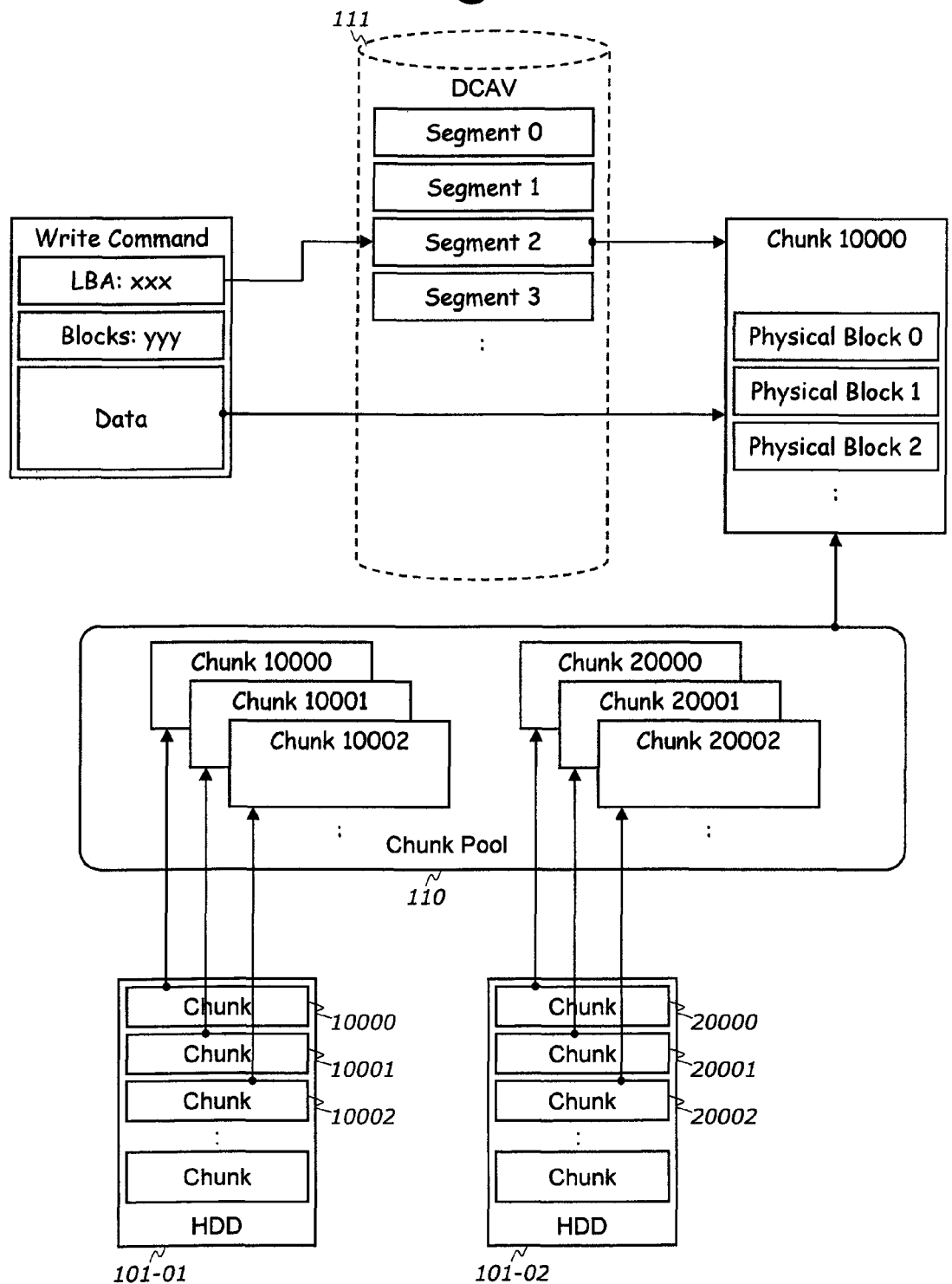
FIG. 2 shows the relationship between write command, dynamic chunk allocation volume, chunk pool, chunks, and HDDs.

A dynamic chunk allocation volume (DCAV) has no allocated data block initially. FIG. 2 shows the relationship between a write command, a dynamic chunk allocation volume 111, a chunk pool 110, chunks, and HDDs. The DCAV 111 is, for example, 100 GB in this embodiment; however, no data block is allocated when the DCAV 111 is created. Only a size of the data volume is assigned. The data blocks will be allocated to the DCAV 111 when the DCAV 111 receives a write command with data from the host computer 10. The chunk is a collection of data blocks in the HDDs 101. The dynamic chunk allocation volume is divided into plural segments as shown in FIG. 2. The size of the chunk and the size of the segment are the same in this embodiment.

Chunks are also explained with FIG. 2. A chunk is composed of one or more data blocks in the HDDs 101. In this embodiment, a chunk is made from blocks in one HDD 101. Each chunk has a unique ID for identifying the chunk. The chunks are aggregated in a chunk pool. The chunk pool is managed by the chunk pool management table 168. In this embodiment, the storage apparatus 100 has one chunk pool 110. So the storage apparatus 100 has one chunk pool management table. However any number of chunk pools can be used.

FIGS. 3(a)-(b) show examples of the chunk pool management table 168. The chunk pool management table 168 includes "RAID Group Number" column 16801 for storing RAID group number (in the case of RAID configuration, see FIG. 11), "HDD Number" column 16802 for storing HDD number(s), "LBA Range" column 16803 for storing a LBA range corresponding to a chunk, "Chunk Number" column 16804 for storing a chunk number for identifying a chunk, "Is Allocated" column 16805 for storing a status whether the chunk has been allocated to a data volume (used) or not (unused), and "Volume Number" column 16806 for storing a volume number, for which the chunk has been allocated to the segment. No chunk is allocated to the DCAV 111 initially, so that all cells in the "Is Allocated" column 16805 and the "Volume Number" column 16806 must be NULL. "RAID Group Number" is only used for a RAID configuration, as seen in FIG. 3(b). FIG. 3(a) shows an example without the "RAID Group Number" column 16801.

FIG. 4 shows an example of the chunk table 169 in the memory 152 of the storage apparatus 100 of FIG. 1(b) for the dynamic chunk allocation volume. Each DCAV 111 has its own chunk table 169 when the DCAV 111 is created. The chunk table 169 includes "Segment Number" column 16901 for storing a segment number for identifying the segment, "Is Allocated" column 16902 for storing a status whether a chunk has been allocated or not, and "Chunk Number" column 16903 for storing a chunk number, to which the chunk has been allocated. No chunk is allocated to the DCAV 111 initially, so that all cells in the "Is Allocated" column 16902 and the "Chunk Number" column 16903 must be NULL.

FIGS. 5(a)-(c) show examples of the chunk pool state table 167 in the memory 152 of the storage apparatus 100 of FIG. 1(b). The chunk pool state table 167 includes "Total Number of Chunks" column 16701 for storing the total number of chunks in the storage apparatus 100, "Total Number of Used Chunks" column 16702 for storing the total number of used chunks in the storage apparatus 100, "Threshold" column 16703 for storing the threshold value which is calculated by the chunk state table monitoring program 163 (90% of the total number of chunks in this embodiment), "Volume Number" column 16704 for storing a data volume number, "Reserved Chunks" column 16705 for storing the total number of reserved chunks at each DCAV, "Used Chunks" column 16706 for storing the total number of used chunks at each DCAV, and "Total Number of Reserved Chunks" column 16707 for storing the total number of reserved chunks in the storage apparatus 100. In this embodiment, the number of reserved chunks is held at each DCAV, so that the data volume creation prohibition program 165 can determine if the DCAV can be created or should be prohibited.

The chunk pool state table monitoring program 163 periodically monitors the chunk pool state table 167 and calculates the threshold value. The threshold value is calculated as 90% of the total number of chunks and stored in the chunk pool state table 167. When HDDs are added, the program updates the total number of chunks and recalculates the threshold. The chunk pool state table monitoring program 163 determines whether the number of used chunks is higher than the threshold. If so, an alert is issued to the management computer 500 and/or the host computer 10. The alert indicates that HDDs should be added soon. The chunk pool state table monitoring program 163 further determines whether the sum of the total number of used chunks and the total number of reserved chunks is higher than the threshold. If so, an alert is issued to the management computer 500 and/or the host computer 10. The alert indicates that HDDs should be added soon.

B. Process Flow

FIG. 6 shows an example of a process flow diagram for a DCAV provisioning process 600. The process is initiated when an administrator on the management computer 500 requests a data volume creation to the data volume provisioning request program 521 by operating the data volume provisioning request program 521. In step 610, the data volume provisioning request program 521 issues a data volume provisioning request to the data volume allocation program 162 on the storage controller 150 with the number of reserved chunks. In step 620, the data volume allocation program 162 temporally updates the chunk pool state table 167. In step 622, the data volume creation prohibition program 165 checks whether a requested data volume can be created or prohibited by comparing the threshold and the sum of the total number of used chunks and the total number of reserved chunks. In the case where the sum of the total number of used chunks and the total number of reserved chunks is higher than the threshold, the data volume creation is prohibited and the chunk pool state table 167 is undone (step 630). Then, in step 632, the data volume creation prohibition program 165 issues an error to the management computer 500. In the case where the sum of the total number of used chunks and the total number of reserved chunks is lower than or equal to the threshold, the data volume is created and a chunk table 169 is created (step 640). Then, the data volume allocation program 162 fixes the chunk pool state table 167 (step 642), and the data volume allocation program 162 issues a data volume creation success status to the management computer 500 (step 644).

Examples of the chunk pool state table 167 are shown in FIGS. 5(*a*)-5(*c*). In this embodiment, one chunk is 2 MB (4096 blocks, 512 bytes per block). In FIG. 5(*a*), there is no data volume in the storage apparatus 100. The total number of chunks is 1,000,000. The total number of used chunks is 0. The threshold is 900,000. In FIG. 5(*b*), the management computer 500 requests a data volume creation with 10,000 of reserved chunks and the data volume is the first data volume in the storage system 100. The data volume creation is successful in this case. In FIG. 5(*c*), the management computer 500 requests a data volume creation with 10,000 of reserved chunks. The total number of reserved chunks reaches 100,000 due to data volume creation at this time. The number of used chunks is now 801,000. The DCAV 111-99 creation is prohibited by the data volume creation prohibition program 165 because the sum of the total number of used chunks and the total number of reserved chunk exceeds the threshold (100,000+801,000=901,000>900,000). An error is issued to management computer 500.

FIGS. 7(*a*)-(*d*) show examples of management screens for creating DCAV on the management computer 500 of FIG. 1(*a*). FIGS. 8(*a*)-(*b*) show examples of the reserved chunk default table 529 in the management computer 500 of FIG. 1(*a*). In FIG. 7(*a*), an administrator specifies only the size of the DCAV and pushes the "OK" button when creating a DCAV. A predefined number of reserved chunks (e.g., 10,000) is applied. The predefined number of reserved chunks is stored in the reserved chunk default table 529 as shown in FIG. 8(*a*). In the screen of FIG. 7(*b*), an administrator specifies the total size of the DCAV and the initial size of the DCAV. The initial size of the DCAV is, for example, the initial size of the data volume when the OS and application program are installed. An administrator specifies the two sizes and pushes the "OK" button for creating a DCAV. In the screen of FIG. 7(*c*), an administrator specifies the total size of the DCAV and the usage of the DCAV. The number of reserved chunks for each usage is predefined and stored in the reserved chunk default table 529 as shown in FIG. 8(*b*). A selected usage is converted to the number of reserved chunks, and then it is provided to the data volume allocation program 162. In the screen of FIG. 7(*d*), an administrator specifies the total size of the DCAV, the usage of the DCAV, and the start date and time of the DCAV. Any write commands are denied until the start date and time.

The created new data volume does not have any chunk initially because the data volume is a dynamic chunk allocation volume DCAV 111. The host computer 10 can get capacity information from the storage apparatus 100. The response program 161 responds with capacity information to the host computer 10 as a result of a READ CAPACITY command even if the DCAV 111 has no chunk. Thus, the host computer 10 recognizes that there is a data volume with a certain size in the storage apparatus 100.

Figure 9:
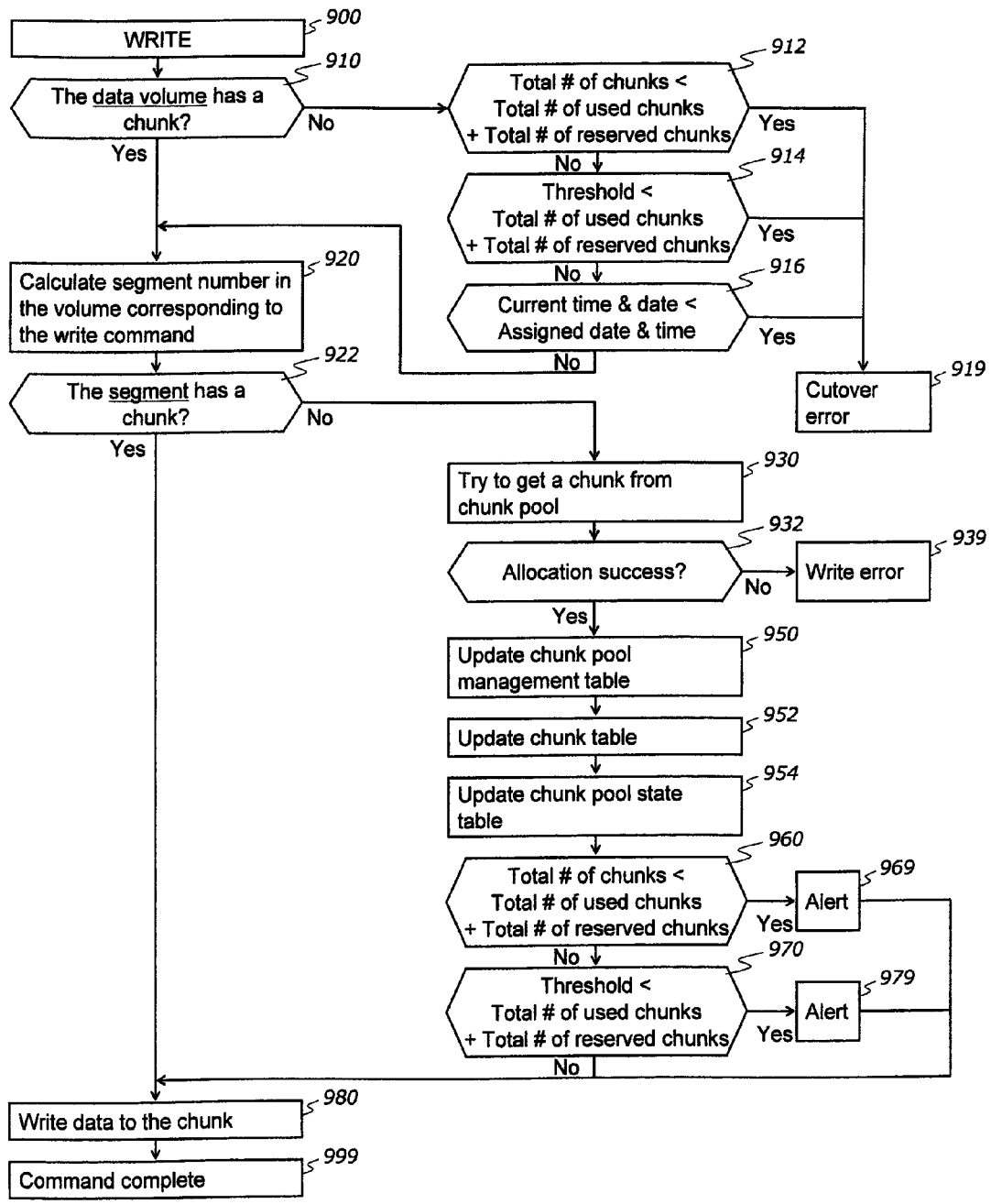
FIG. 9 shows an example of a process flow diagram of a write operation involving the response program, the dynamic chunk allocation program, and the data volume creation prohibition program in the memory of the storage apparatus of FIG. 1(b) according to the first embodiment.

FIG. 9 shows an example of a process flow diagram of a write operation by a storage apparatus program involving the response program 161, the dynamic chunk allocation program 160, and the data volume creation prohibition program 165 in the memory 152 of the storage apparatus 100 of FIG. 1(*b*) according to the first embodiment.

In step 910, the storage apparatus program checks if this DCAV 111 has no chunk. If so, the program proceeds to step 912. In step 912, the program checks if the sum of the total number of used chunks and the total number of reserved chunks is higher than the total number of chunks. If so, the program proceeds to step 919. (Note that step 912 may be skipped according to a predefined mode.) Otherwise, the program continues to step 914, and checks if the sum of the total number of used chunks and the total number of reserved chunks is higher than the threshold. If so, the program proceeds to step 919. (Note that step 914 may be skipped according to a predefined mode.) Otherwise, the program continues to step 916, and checks if the assigned date and time to the data volume have expired. (This step is skipped if the data and time has not been assigned to the data volume.) If not expired, the program proceeds to step 919, and sends a cutover error to the host computer 10. If expired, the program proceeds to step 920.

In step 920, the program calculates the segment number(s) in the data volume corresponding to the write command. Then, in step 922, the program checks if the segment(s) has a chunk. If the segment(s) already has a chunk, the program proceeds to step 980. Otherwise, the program continues to step 930, and tries to get a chunk from the chunk pool. In step 932, the program checks if the chunk allocation is successful. If not, the program proceeds to step 939, and sends a write error to the host computer 10. If successful, the program continues to step 950, and updates the chunk pool management table 168. In step 952, the program updates the chunk table 169. In step 954, the program updates the chunk pool state table 167. This involves decreasing the number of the reserved chunks if the current value is not zero, increasing the number of the used chunks, updating the total number of used chunks, and updating the total number of reserved chunks. Then, in step 960, the program checks if the sum of the total number of used chunks and the total number of reserved chunks is higher than the total number of chunks. If so, the program proceeds to step 969, and issues an alert to the management computer 500. Otherwise, the program continues to step 970, and checks if the sum of the total number of used chunks and the total number of reserved chunks is higher than the threshold. If so, the program proceeds to step 979, and issues an alert to the management computer 500. Otherwise, the program continues to step 980, and writes data to the chunk allocated to the segment. In step 999, the program issues a command complete response.

According to steps 910, 912, 914 and 919, a write command is denied in accordance with the total number of reserved chunks when the first write operation is executed to the DCAV. This sequence is significant for cases where a DCAV was created some time beforehand, perhaps a long time ago, at which time the sum of the total number of used chunks and the total number of reserved chunks is lower than or equal to the threshold, and, after that, other DCAVs have been consuming chunks. At the present time now, the sum of the total number of used chunks and the total number of reserved chunks is higher than the total number of chunks (step 912); or the sum of the total number of used chunks and the total number of reserved chunk is higher than the threshold (step 914).

Figure 10:
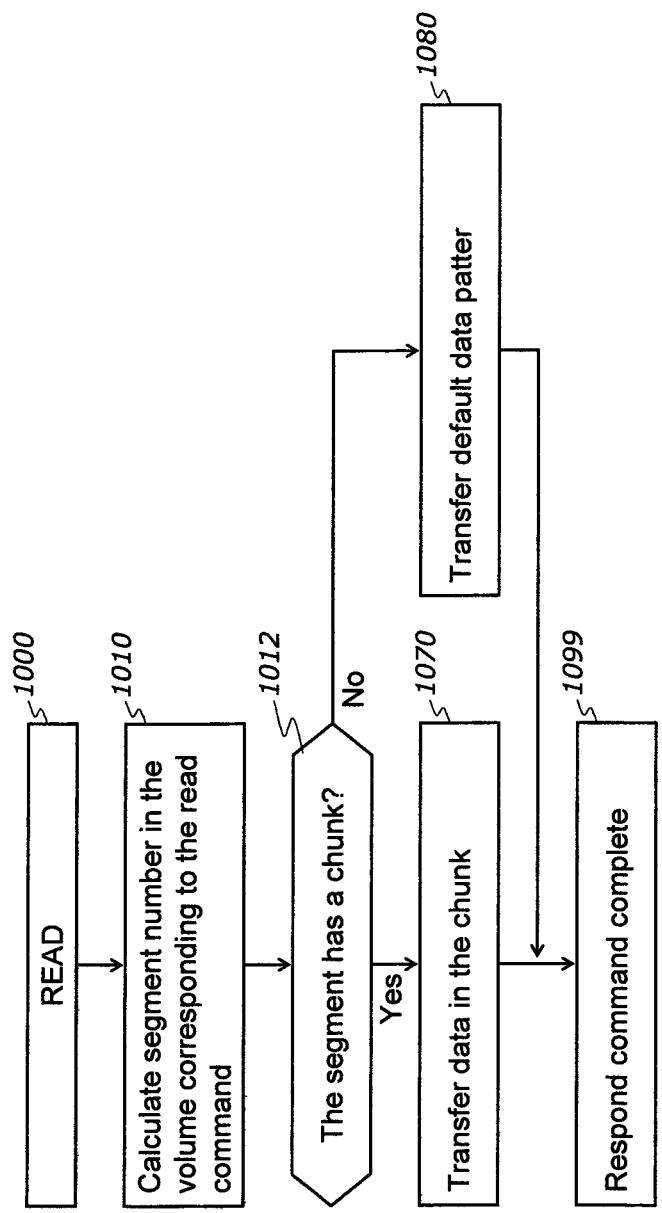
FIG. 10 shows an example of a process flow diagram of a read operation involving the response program in the memory of the storage apparatus of FIG. 1(b).

FIG. 10 shows an example of a process flow diagram of a read operation involving the response program 161 in the memory 152 of the storage apparatus 100 of FIG. 1(*b*). In step 1010, the program calculates the segment number(s) in the data volume corresponding to the read command. In step 1012, the program checks if the segment(s) has a chunk. If the segment(s) has a chunk already, the program proceeds to step 1070. If the segment(s) has no chunk, the program proceeds to step 1080. In step 1070, the program transfers data in the chunk allocated to the segment. In step 1080, the program transfers a default data pattern (e.g., all zero data pattern). Finally, in step 1099, the program issues a command complete response.

Figure 11:
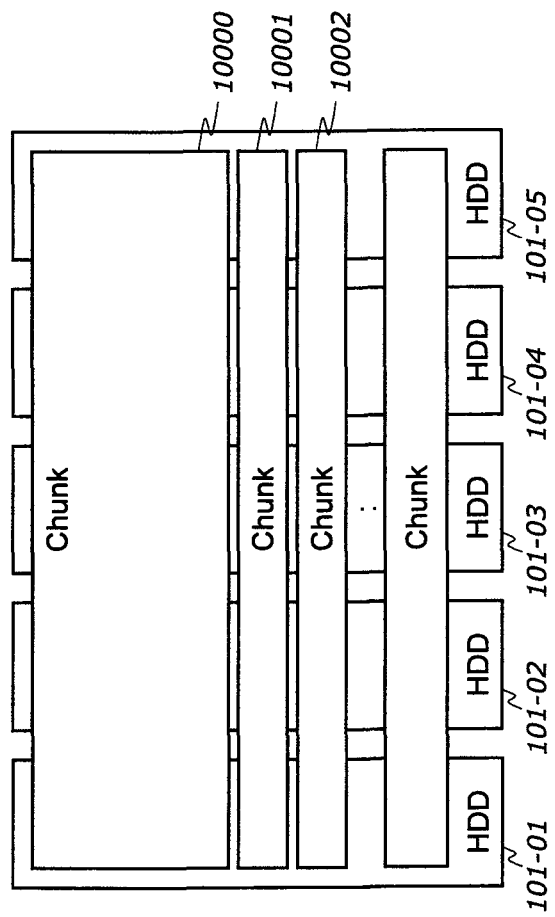
FIG. 11 shows an example of a RAID configuration having chunks in the RAID group.

According to one variation, a HDD 101 can be replaced by a RAID group. FIG. 11 shows an example of a RAID configuration having chunks (10000, 10001, 10002) in the RAID group. The RAID (Redundant Array of Independent Disks) group is composed of plural HDDs (101-01, 101-02, 101-03, 101-04, 101-05) with RAID algorithm. The RAID algorithm is implemented in the storage controller 150. The chunk pool management table 168 shown in FIG. 3(*b*) is used for the RAID configuration.

Second Embodiment

In the second embodiment, DCAV combined with snapshot capability is provided. A snapshot is one of the data volume images at a specified timing. The management computer 500 or the host computer 10 may issue a snapshot request to the DCAV 111. Otherwise the storage apparatus 100 itself may take a snapshot periodically (the cycle may be predefined). FIG. 12 shows an example of a chunk table 169 in the memory 152 of the storage apparatus 100 of FIG. 1(*b*) according to the second embodiment. FIG. 13 shows an example of a snapshot catalog table 170 in the memory 152. The snapshot program 164 assigns a new snapshot number and records the date and time in the snapshot catalog table 170 of FIG. 13. The chunk table 169 of FIG. 12 can store the chunk number corresponding to each snapshot number.

The snapshot catalog table 170 of FIG. 13 includes "Volume Number" column 17001 for storing the data volume number in the storage apparatus 100, "Snapshot Number" column 17002 for storing the assigned snapshot number, and "Timestamp" column 17003 for storing a timestamp when the snapshot is taken.

In the snapshot operation of the second embodiment, a snapshot is taken at one hour intervals at each DCAV 111. The snapshot program 164 assigns a new snapshot number and stores the snapshot number and timestamp in the snapshot catalog table 170. FIG. 13 shows the DCAV 111-00 has ten snapshot images, with snapshot numbers 111-00-00 to 111-00-09 taken Apr. 29, 2009 from 1:00 pm to 10:00 pm.

Figure 14:
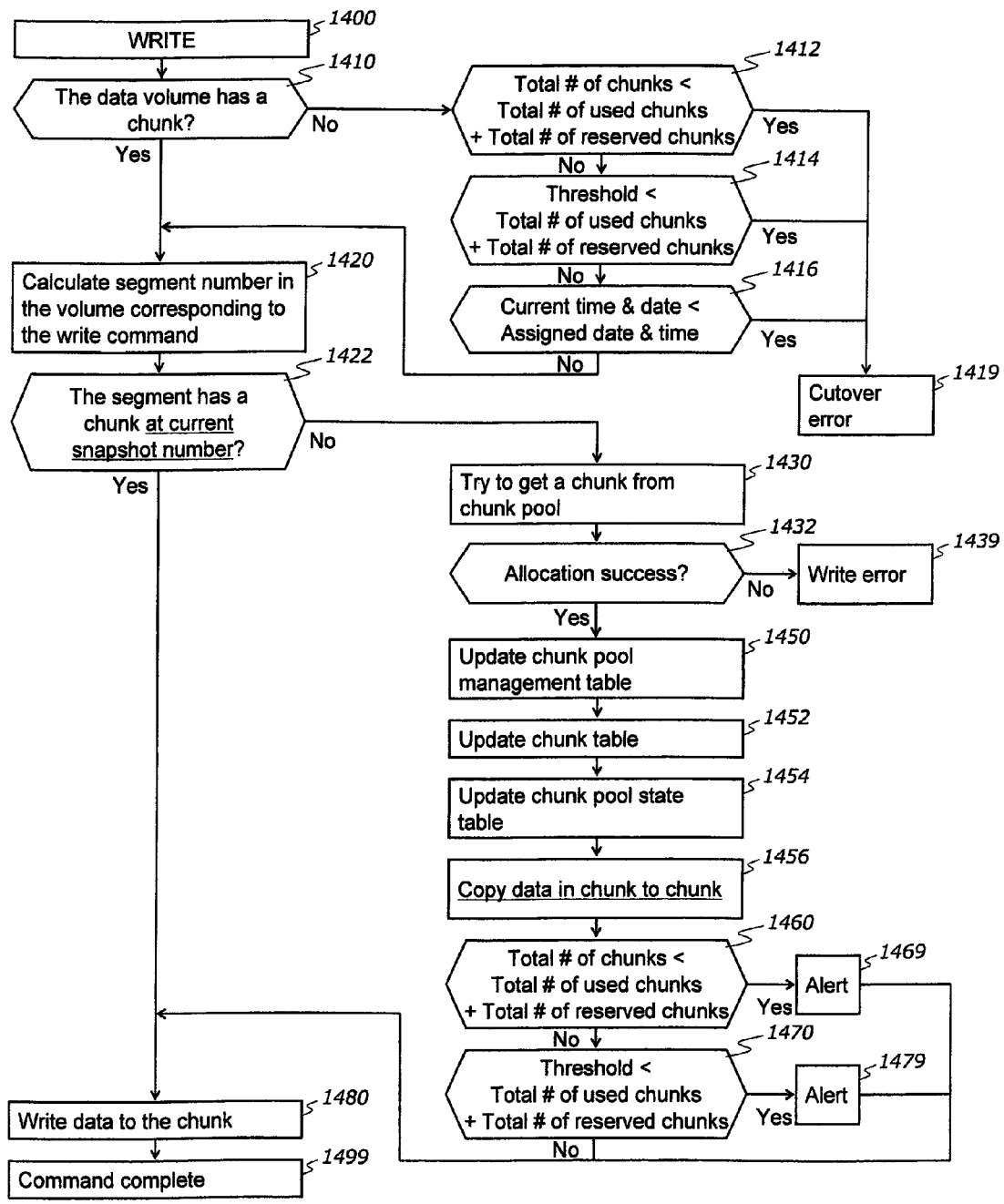
FIG. 14 shows an example of a process flow diagram of a write operation with snapshot involving the response program, the dynamic chunk allocation program, and the data volume creation prohibition program in the memory of the storage apparatus of FIG. 1(b) according to the second embodiment.

FIG. 14 shows an example of a process flow diagram of a write operation 1400 with snapshot by a storage apparatus program involving the response program 161, the dynamic chunk allocation program 160, and the data volume creation prohibition program 165 in the memory 152 of the storage apparatus 100 of FIG. 1(*b*) according the second embodiment. Those features that are different from the flow diagram of FIG. 9 (write operation of the first embodiment) are underlined.

In step 1410, the storage apparatus program checks if this DCAV 111 has no chunk. If so, the program proceeds to step 1412. In step 1412, the program checks if the sum of the total number of used chunks and the total number of reserved chunks is higher than the total number of chunks. If so, the program proceeds to step 1419. (Note that step 1412 may be skipped according to a predefined mode.) Otherwise, the program continues to step 1414, and checks if the sum of the total number of used chunks and the total number of reserved chunks is higher than the threshold. If so, the program proceeds to step 1419. (Note that step 1414 may be skipped according to a predefined mode.) Otherwise, the program continues to step 1416, and checks if the assigned date and time to the data volume have expired. (This step is skipped if the data and time has not been assigned to the data volume.) If not expired, the program proceeds to step 1419, and sends a cutover error to the host computer 10. If expired, the program proceeds to step 1420.

In step 1420, the program calculates the segment number(s) in the data volume corresponding to the write command. Then, in step 1422, the program checks if the segment(s) has a chunk at current snapshot number. If the segment(s) already has a chunk, the program proceeds to step 1480. Otherwise, the program continues to step 1430, and tries to get a chunk from the chunk pool. In step 1432, the program checks if the chunk allocation is successful. If not, the program proceeds to step 1439, and sends a write error to the host computer 10. If successful, the program continues to step 1450, and updates the chunk pool management table 168. In step 1452, the program updates the chunk table 169. In step 1454, the program updates the chunk pool state table 167. This involves decreasing the number of the reserved chunks if the current value is not zero, increasing the number of the used chunks, updating the total number of used chunks, and updating the total number of reserved chunks. Then, in step 1456, the program copies data in the chunk at the previous snapshot number to the assigned chunk. (This step may be skipped if the write command overwrites all of data in the chunk or there are no previous chunks.) In step 1460, the program checks if the sum of the total number of used chunks and the total number of reserved chunks is higher than the total number of chunks. If so, the program proceeds to step 1469, and issues an alert to the management computer 500. Otherwise, the program proceeds to step 1470, and checks if the sum of the total number of used chunks and the total number of reserved chunks is higher than the threshold. If so, the program proceeds to step 1479, and issue an alert to the management computer 500. Otherwise, the program continues to step 1480, and writes data to the chunk allocated to the segment. In step 1499, the program issues a command complete response. These taken snapshots are used for referring to old images of data volume. For example, restoring old files from old images of data volume is a typical use case.

In one example, the write data is stored in one or more primary volumes and the snapshots of the one or more primary volumes are stored in one or more secondary volumes of the storage apparatus 100. The storage apparatus program may prohibit or warn against allocating chunks to a new volume based on the number of chunks in the one or more primary volumes in one case, and on the number of chunks in the one or more primary volumes and the one or more secondary volumes in another case. The number of chunks may be the number of used chunks or a sum of the number of used chunks and the number of reserved chunks. The chunks may include used chunks or both used chunks and reserved chunks.

Figure 15:
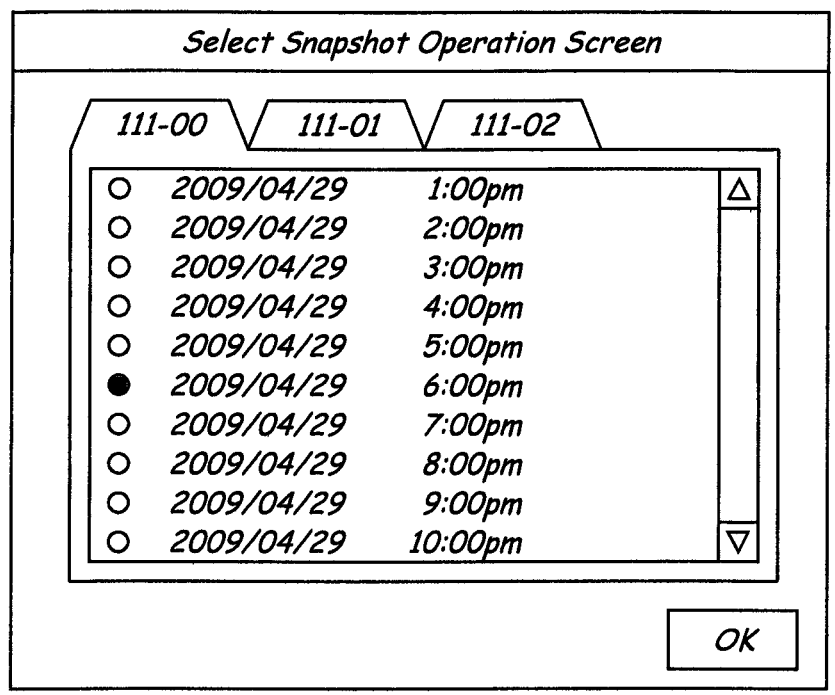
FIG. 15 shows an example of a screen image of the management computer for a select snapshot operation.

FIG. 15 shows an example of a screen image of the management computer 500 for a select snapshot operation. The management computer 500 displays snapshot catalog on this screen. The snapshot management program 522 requests snapshot catalog information (stored in the snapshot catalog table 170) from the storage apparatus 100 and displays it. On the screen shown in FIG. 15, an administrator can select an image for restoring a file. In FIG. 15, selection is made for the data volume 111-00. The snapshot image at Apr. 29, 2009 6:00 pm is selected. The "OK" button is pushed on the screen, and then the snapshot management program 522 issues a snapshot number to the data volume. A read operation at the data volume is executed at the specified snapshot image.

The read operation at the specified snapshot number is explained with reference to FIG. 10 (read operation in the first embodiment). The only difference between the second embodiment and the first embodiment occurs in step 1070. In step 1070, the program transfers data in the chunk allocated to the segment. In the second embodiment, a chunk which is the closest to the specified snapshot number is selected. If the segment has two chunks at 111-00-002 (3:00 pm) and 111-00-004 (5:00 pm), and snapshot number 111-00-05 (6:00 pm) is specified, then the chunk at 111-00-004 (5:00 pm) is selected. If the segment has two chunks at 111-00-002 (3:00 pm) and 111-00-006 (7:00 pm), and snapshot number 111-00-05 (6:00 pm) is specified, then the chunk at 111-00-002 (3:00 pm) is selected.

In the second embodiment, the chunks are classified into three categories. In the unused category, the chunks have no data. In the used category, the chunks have data and the data are needed for responding to host computers as the current volume. In the snapshot category, the chunks have data and the data are needed for responding at a specified snapshot image.

Figure 16:
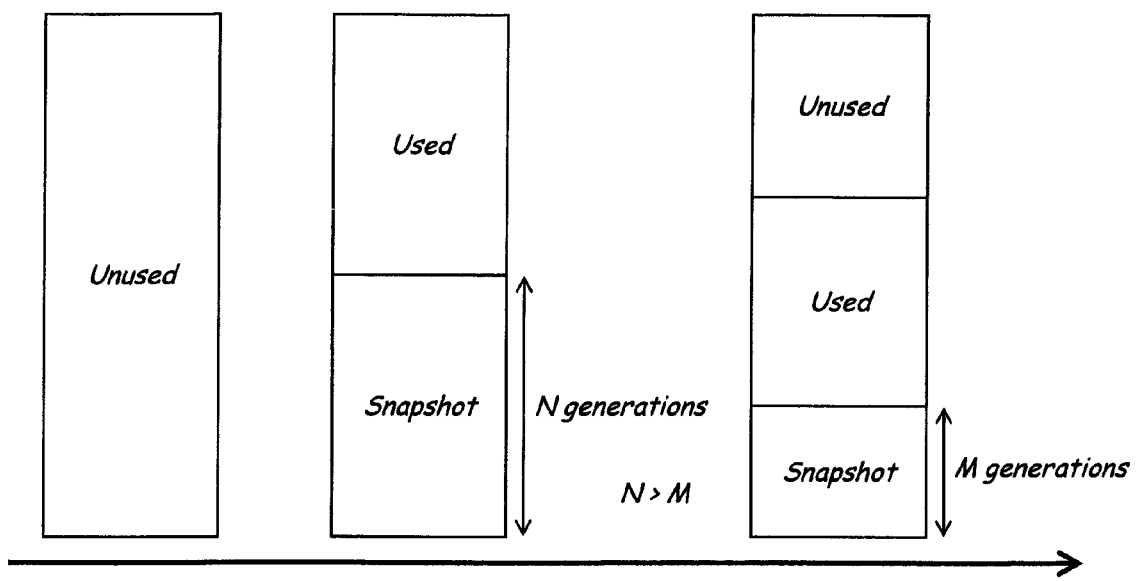
FIG. 16 illustrates the used and unused chunks of data volumes as the number of snapshot generation is decreased.

FIG. 16 illustrates the used and unused chunks of data volumes as the number of snapshot generations is decreased. To take a snapshot periodically and keep writing data to data volumes, the unused chunks will run out eventually. Each chunk is classified under only two categories: used and snapshot. The chunks in the snapshot category may be converted to unused. However, in this case, the number of snapshot generations is decreased, as seen in FIG. 16.

FIG. 17 shows an example of a classify table 171 in the memory 152 of the storage apparatus 100 of FIG. 1(*b*) according to the second embodiment. Each chunk is classified and registered in the classify table 171. The chunks in the snapshot category are registered with the snapshot number and timestamp. The classify table 171 is used for managing the chunks especially for deleting specified snapshot generation(s).

Figure 18:
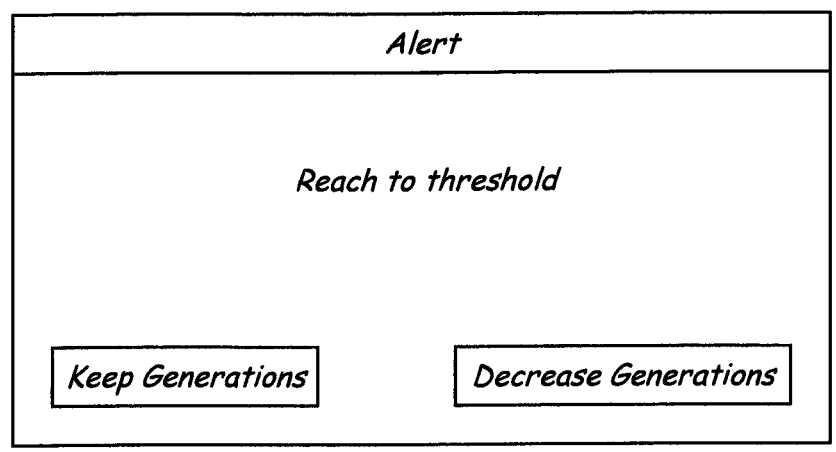
FIG. 18 shows an example of a screen display in the management computer for a selection involving snapshot generations.

When the sum of the number of used chunks and the number of snapshot chunks reaches the threshold, two choices are considered. One is to add more HDDs. The other is to decrease the number of snapshot generations. To keep number of snapshot generations, one or more HDDs must be added. The snapshot program 164 issues an alert to the management computer 500. The management computer 500 displays a screen shown in FIG. 18 for selecting the choice. If an administrator pushes "decrease generation," another management screen is displayed as shown in FIG. 19 based on the classify table 171 acquired from the snapshot program 164. FIG. 19 shows an example of a screen display in the management computer for a select delete generation operation screen. In the management screen of FIG. 19, an administrator can select generations by checking a checkbox. The number of estimated freed chunks is displayed at area 18001 in real-time. When the delete button 18002 is pushed, the management computer 500 issues a snapshot delete request to the snapshot program 164. The snapshot program 164 converts the snapshot chunks to unused chunks in accordance with the specified snapshot number(s).

Another embodiment of the invention is produced by combining features of the first and second embodiments. The data volume allocation program 162 may prohibit new volume creation in the case where the sum of the total number of used chunks, the number of snapshot chunks, and the number of reserved chunks is higher than the threshold. Otherwise, the chunk pool state table monitoring program 163 may issue an alert. The chunk pool state table monitoring program 163 refers to the chunk pool state table 167 and classify table 171 for this alert. When the management computer 500 receives the alert, the management computer 500 may display screens shown in FIG. 18 and FIG. 19 as mentioned above. After deleting some snapshot generations, an administrator may try creating a new data volume.

FIG. 20 shows an example of a chunk consumption trace table 166 in the memory 152 of the storage apparatus 100 of FIG. 1(*b*). The chunk state table monitoring program 163 may periodically (e.g., at 60 second intervals) record the total number of chunks, used chunks, unused chunks, and snapshot chunks in the chunk consumption trace table 166. Also the chunk state table monitoring program 163 may estimate their future consumption, for instance, based on the average growth rate. The allocation of chunks to create a new data volume may be prohibited or warned against before the new data volume is created, in accordance with the estimated future consumption of the chunks.

FIG. 21 shows a graph which is visualized from the chunk consumption trace table 166. At time t0, the storage apparatus has N unused chunks, no used chunks, and no snapshot chunks. Some data volume creations are executed. Chunks are reserved. At t1, installations of the OS 13 and application program 14 are started. Chunks are rapidly consumed. At t2, the installations are completed. At t3, the storage apparatus 100 starts taking snapshots. Snapshot chunks are increased. At t4, the sum of the total number of used chunks and the total number of snapshot chunks reaches the threshold. Some snapshot generations are freed. At t5, the sum of the total number of used chunks and the total number of snapshot chunks reaches the threshold again. Additional HDDs are added and unused chunks are added. The total number of chunks in the storage apparatus 100 goes up to M. The threshold is recalculated. At t6, now, some data volume creations are executed. Some data volume creations occur right now. Some data volume creations are reserved at t7. The data volume creations at t6 are not prohibited since there are enough unused chunks. The data volume creations at t7 which is a future point from now are prohibited because it is estimated that there are not enough unused chunks on the basis of the average growth rates and the total number of reserved chunks at that point. Of course, an administrator may try to free up some snapshot generations to avoid the prohibition.

Of course, the system configuration illustrated in FIG. 1(a) is a purely exemplary information system in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for controlling data volume creation at the data storage system with dynamic chunk allocation capability. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
   a processor;
   a memory; and
   a plurality of chunks that are to be allocated to data volumes, each chunk having one or more data blocks;
   wherein the plurality of chunks include zero or more used chunks which are allocated to one or more data volumes, and zero or more remaining chunks which are not used chunks;
   wherein the processor is configured to manage the data volumes to which one or more chunks is allocated in response to write access, and to manage a total number of used chunks which have been allocated to one or more data volumes and a total number of reserved chunks which are reserved for use in the one or more data volumes but have not been allocated to any data volume;
   wherein the processor is configured to control data volume creation of data volumes; and
   wherein if the processor receives a new data volume creation request with a number of reserved chunks for a new data volume, the processor prohibits or warns against the new data volume creation request before the new data volume is created, based on the managed total number of the used chunks and the managed total number of the reserved chunks and the number of reserved chunks for the new data volume.

2. A storage system according to claim 1,
   wherein the new data volume creation operation is prohibited if a sum of a total number of the used chunks and a total number of the reserved chunks is greater than a total number of the chunks in the storage system; and
   wherein the new data volume creation operation is warned against with an alert if a sum of a total number of the used chunks and a total number of the reserved chunks is greater than a threshold which is equal to a percentage of a total number of the chunks in the storage system, which is less than 100 percent.

3. A storage system according to claim 1,
   wherein the plurality of chunks include one or more snapshot chunks which are allocated for data volume images of one or more data volumes at certain times representing snapshot generations of the one or more data volumes; and
   wherein the plurality of chunks include zero or more remaining chunks which are not used chunks and which are not snapshot chunks.

4. A storage system according to claim 3,
   wherein the new data volume creation operation is prohibited if a sum of a total number of the used chunks, a total number of the snapshot chunks, and a total number of the reserved chunks is greater than a total number of the chunks in the storage system; and
   wherein the new data volume creation operation is warned against with an alert if a sum of a total number of the used chunks, a total number of the snapshot chunks, and a total number of the reserved chunks is greater than a threshold which is equal to a percentage of a total number of the chunks in the storage system, which is less than 100 percent.

5. A storage system according to claim 3,
   wherein the memory includes a snapshot module configured, upon receiving a snapshot delete request, to convert one or more snapshot chunks to unused chunks.

6. A storage system comprising:
a processor;
a memory; and
a plurality of chunks that are to be allocated to data volumes which include at least one primary volume and at least one secondary volume, the at least one secondary volume being used to store data which is based on data stored in the at least one primary volume, each chunk having one or more data blocks;
wherein the plurality of chunks include zero or more used chunks which are allocated to one or more data volumes and zero or more unused chunks which are not allocated to one or more data volumes;
wherein the processor is configured to manage the data volumes to which one or more chunks is allocated in response to write access, and to manage a total number of used chunks which have been allocated to one or more data volumes and a total number of reserved chunks which are reserved for use in the one or more data volumes but have not been allocated to any data volume;
wherein the processor is configured to control data volume creation of data volumes; and
wherein if the processor receives a new data volume creation request with a number of reserved chunks for a new data volume, the processor prohibits or warns against the new data volume creation request before the new data volume is created, based on the managed total number of the used chunks and the managed total number of the reserved chunks in the at least one primary volume and the at least one secondary volume, and the number of reserved chunks for the new data volume.

7. A storage system according to claim 6,
wherein the new data volume creation operation is prohibited if a sum of a total number of the used chunks and a total number of the reserved chunks is greater than a total number of the chunks in the storage system; and
wherein the new data volume creation operation is warned against with an alert if a sum of a total number of the used chunks and a total number of the reserved chunks is greater than a threshold which is equal to a percentage of a total number of the chunks in the storage system, which is less than 100 percent.

8. A storage system according to claim 6,
wherein the plurality of chunks include one or more snapshot chunks which are allocated to the at least one secondary volume for data volume images of the at least one primary volume at certain times representing snapshot generations of the at least one primary volume.

9. A storage system according to claim 8,
wherein the memory includes a snapshot module configured, upon receiving a snapshot delete request, to convert one or more snapshot chunks in the secondary volume to unused chunks.

10. A storage system according to claim 6,
wherein a new data volume creation operation is to be performed to create a new data volume in response to a write command received by the storage system; and
wherein the new data volume creation operation in response to the write command is prohibited until a specified date and time assigned to the new data volume has expired.

11. A storage system comprising:
a processor;
a memory; and
a plurality of chunks that are to be allocated to data volumes, each chunk having one or more data blocks;
wherein the plurality of chunks include zero or more used chunks which are allocated to one or more data volumes, and zero or more remaining chunks which are not used chunks;
wherein the processor is configured to manage the data volumes to which one or more chunks is allocated in response to write access, and to manage a total number of used chunks which have been allocated to one or more data volumes and a total number of reserved chunks which are reserved for use in the one or more data volumes but have not been allocated to any data volume;
wherein the processor is configured to control data volume creation of data volumes; and
wherein if the processor receives a new data volume creation request with a number of reserved chunks for a new data volume, the processor prohibits the new data volume creation request before the new data volume is created, based on the managed total number of the used chunks and the managed total number of the reserved chunks and the number of reserved chunks for the new data volume.

12. A storage system according to claim 11,
wherein the new data volume creation operation is prohibited if a sum of a total number of the used chunks and a total number of the reserved chunks is greater than a total number of the chunks in the storage system.

13. A storage system according to claim 12,
wherein the new data volume creation operation is warned against with an alert if a sum of a total number of the used chunks and a total number of the reserved chunks is greater than a threshold which is equal to a percentage of a total number of the chunks in the storage system, which is less than 100 percent.

14. A storage system according to claim 11,
wherein the plurality of chunks include one or more snapshot chunks which are allocated for data volume images of one or more data volumes at certain times representing snapshot generations of the one or more data volumes;
wherein the plurality of chunks include zero or more remaining chunks which are not used chunks and which are not snapshot chunks; and
wherein the remaining chunks include the reserved chunks and unused chunks, and the unused chunks are not allocated to the one or more data volumes.

15. A storage system according to claim 14,
wherein the new data volume creation operation is prohibited if a sum of a total number of the used chunks, a total number of the snapshot chunks, and a total number of the reserved chunks is greater than a total number of the chunks in the storage system; and
wherein the new data volume creation operation is warned against with an alert if a sum of a total number of the used chunks, a total number of the snapshot chunks, and a total number of the reserved chunks is greater than a threshold which is equal to a percentage of a total number of the chunks in the storage system, which is less than 100 percent.

* * * * *